United States Patent
Stelzer et al.

[19]

[11] Patent Number: 6,082,085
[45] Date of Patent: Jul. 4, 2000

[54] FOLIAGE MOWING IMPLEMENT HAVING MECHANICAL DRIVE WITH MAIN GEARBOX ROTATION

[75] Inventors: Robert A. Stelzer, Coldwater; Leroy Kluver, Celina, both of Ohio

[73] Assignee: AGCO Corporation, Duluth, Ga.

[21] Appl. No.: 09/078,001

[22] Filed: May 13, 1998

[51] Int. Cl.$^7$ .......................... A01D 34/03; A01D 23/00
[52] U.S. Cl. ........................ 56/14.9; 56/7; 56/6
[58] Field of Search .................. 56/6, 7, 14.9; 464/179, 464/180, 134, 170, 176, 177; 74/608, 609

[56] References Cited

U.S. PATENT DOCUMENTS

| | | |
|---|---|---|
| 1,646,455 | 10/1927 | Johnson et al. . |
| 4,018,036 | 4/1977 | Cicci . |
| 4,187,664 | 2/1980 | Meek et al. . |
| 4,366,877 | 1/1983 | Vissers et al. . |
| 4,433,533 | 2/1984 | Giani . |
| 4,525,987 | 7/1985 | Werner et al. . |
| 4,662,162 | 5/1987 | Bettencourt et al. . |
| 4,714,123 | 12/1987 | Ermacora et al. . |
| 4,719,742 | 1/1988 | Ermacora et al. . |
| 4,738,461 | 4/1988 | Stephenson et al. . |
| 4,793,430 | 12/1988 | Stephenson et al. . |
| 4,805,927 | 2/1989 | Stephenson et al. . |
| 4,838,013 | 6/1989 | Arnold et al. . |
| 4,838,358 | 6/1989 | Freudendahl . |
| 4,858,418 | 8/1989 | von Allwoerden . |
| 4,860,526 | 8/1989 | Hottes . |
| 4,860,527 | 8/1989 | Maarten . |
| 4,899,523 | 2/1990 | Frumholtz et al. . |
| 4,923,014 | 5/1990 | Mijnders . |
| 4,926,621 | 5/1990 | Torras ........................................... 56/6 |
| 4,986,061 | 1/1991 | Frumholtz et al. . |
| 4,986,064 | 1/1991 | Ermacora . |
| 5,060,462 | 10/1991 | Helfer et al. . |
| 5,076,042 | 12/1991 | Koorn et al. . |
| 5,094,063 | 3/1992 | Wattron et al. . |
| 5,107,663 | 4/1992 | Wattron et al. . |
| 5,172,539 | 12/1992 | Jennnings et al. . |
| 5,241,809 | 9/1993 | Wolff et al. . |
| 5,265,403 | 11/1993 | Franet et al. . |
| 5,272,859 | 12/1993 | Pruitt et al. . |
| 5,345,752 | 9/1994 | Pruitt et al. . |
| 5,430,997 | 7/1995 | O'Halloran et al. . |
| 5,433,064 | 7/1995 | Schmitt et al. . |
| 5,463,852 | 11/1995 | O'Halloran et al. . |
| 5,522,208 | 6/1996 | Wattron . |
| 5,544,475 | 8/1996 | Skibo . |
| 5,566,535 | 10/1996 | Pruitt . |
| 5,566,536 | 10/1996 | Krafka et al. . |
| 5,642,607 | 7/1997 | Stephenson et al. . |
| 5,964,076 | 10/1999 | Loehr . |

*Primary Examiner*—Eileen D. Lillis
*Assistant Examiner*—Raymond W Addie
*Attorney, Agent, or Firm*—Cook, Alex, McFarron, Manzo, Cummings, & Mehler, Ltd.

[57] ABSTRACT

A foliage harvester is provided, as is a mechanical drive arrangement which includes a pivotally mounted main gearbox. An extension assembly extends forwardly with respect to the main gearbox for a relatively short length, and a connection assembly operatively joins the rotating portion near the rear end of the mechanical drive assembly in a manner which prevents substantially any side-to-side or generally horizontal movement between that portion of the mechanical drive assembly and the rotatable main gearbox. At the same time, this operative joining incorporating use of the connection assembly permits limited up-and-down or generally vertical movement of the mechanical drive assembly with respect to the pivotable main gearbox. In an especially preferred arrangement, the implement is a center pivot mower conditioner, and the mechanical drive operates the cutting and conditioning assemblies during operation of the mower conditioner on either side behind the towing vehicle or tractor.

29 Claims, 7 Drawing Sheets

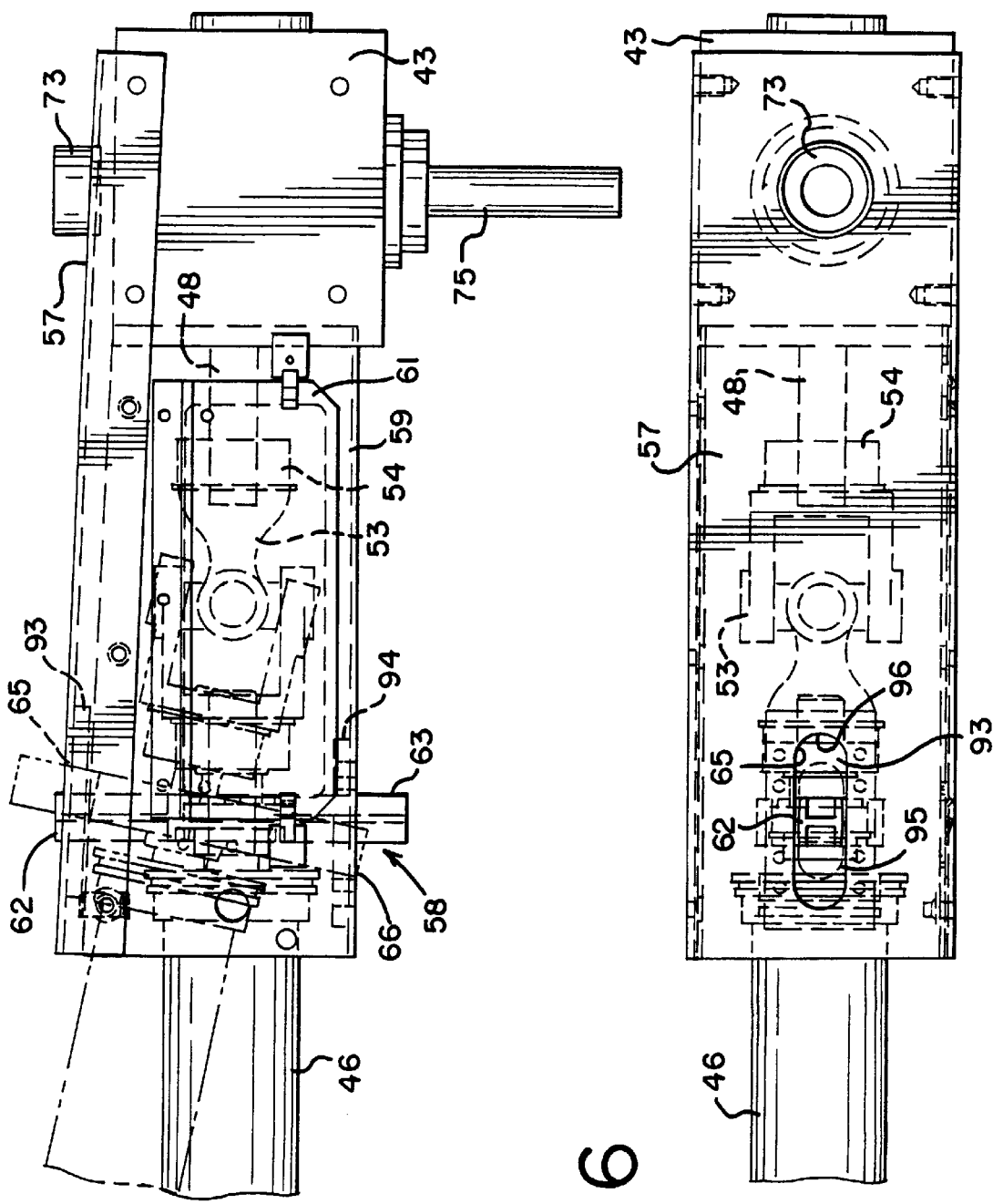

FOLIAGE MOWING IMPLEMENT HAVING MECHANICAL DRIVE WITH MAIN GEARBOX ROTATION

DESCRIPTION

BACKGROUND OF THE INVENTION

This invention generally relates to foliage mowing implements which are towed behind and which are mechanically driven by a towing vehicle such as a tractor having a power takeoff (PTO) drive system. More particularly, the invention relates to implements of the type which have a swingable tongue by which the implement is hitched to the towing vehicle. When the towing vehicle is steered through turns, especially when making a turn at the end of a field, the implement undergoes substantial pivoting movement through the swingable tongue or hitch mechanism, thereby necessitating some means for accomplishing pivoting of the mechanical drive mechanism with respect to the implement. The present invention incorporates a gearbox pivotally mounted to the implement, which gearbox has an extension assembly engaged with and responsive to swinging movement of the rear end portion of the mechanical drive assembly.

The present invention finds particular application with respect to so-called center pivot foliage mowing implements such as mower conditioners. An example in this regard is Cicci et al U.S. Pat. No. 4,018,036 which shows a mower conditioner having an arched tongue which is pivotally mounted at the right-to-left center of the mower conditioner. With this general arrangement, the user is able to swing the mower conditioner between the right side and the left side of the pulling vehicle in order to thereby facilitate harvesting operations while reducing crop damage. The general advantages of such a center pivot implement are generally known in the art and are illustrated by this patent, its disclosure being incorporated by reference hereinto.

It is recognized in the art that having the mowing implements hydraulically driven avoids drive train design problems attendant to mechanically transmitting the power needed to drive the crop engagement mechanisms of the implement. Generally speaking, hydraulic conduits more readily accommodate pivoting or swinging movements between components, such as the relatively wide pivoting swings which need to be achieved by a center pivot device of the general type shown in U.S. Pat. No. 4,018,036. However, foliage-engaging mechanisms such as those found in larger mower conditioners and the like, especially including disc mower conditioners, often require more power than can be conveniently provided by hydraulic drive systems. Accordingly, approaches have been put forth for accomplishing mechanical driving of these mechanisms, typically by transferring rotational PTO power through an elongated rotating shaft and to a main gearbox on the implement.

One approach in this regard is to provide arrangements wherein the vertical pivot axis of the swinging tongue is in general vertical alignment with a vertical pivot axis of a pivoting gearbox. In such a "coaxial" arrangement, the mechanical drive shaft and the swinging tongue move in virtual unison with each other in an effort to avoid possible misalignment between the mechanical driving mechanism and the swingable tongue. Patents which exemplify this approach are Ermacora et al U.S. Pat. No. 4,719,742 and Frumholtz et al U.S. Pat. No. 4,899,523, incorporated hereinto by reference. Such a coaxial approach thwarts design freedom and requires an arrangement whereby critical pivoting components must be concentrated in a single area, with one generally on top of the other. These approaches also are complicated by the need in most mower conditioner type implements to allow for up and down pivoting of the implement having the driven mechanisms, such as the header of a disc mower conditioner. While a header or the like usually must be thus pivotable to move between a ground-engaging orientation and a transport orientation, there is no such pivoting relationship between the swingable tongue and the implement. In other words, the respective drive axis and hitch axis often are not truly coaxial during all orientations of the implement.

Mechanical drive arrangements which embody pivoting main gearboxes which are not in alignment with a tongue pivot include those shown in von Allwoerden U.S. Pat. No. 4,858,418 and Pruitt et al U.S. Pat. No. 5,272,859, which are incorporated hereinto by reference. von Allwoerden incorporates a telescoping mechanical drive shaft which is pivotally mounted along a drive axis spaced directly in front of the centrally located hitch axis. The mechanical drive arrangement requires a forked support joint composed of a front part and a rear part joined at a horizontal pivot axis, which is said to accommodate vertical floating movement of the mowing units as they follow the ground contour. This approach relies upon a general movement of the swinging components in order to permit the mechanical driving to proceed at different orientations. There is essentially no direct control mechanism to accomplish these changes.

Pruitt adds a steering structure which directly interconnects the tongue and the rotatable gearbox in order to have the tongue directly turn the pivoting gearbox when the tongue swings from side-to-side. This approach incorporates an added, telescoping structure in order to achieve this steering function, while also utilizing a drive train having opposite joints at equal angles so as to develop a split angle arrangement.

SUMMARY OF THE INVENTION

In accordance with the present invention, a foliage mowing implement is provided which has foliage-cutting members within a header that is supported by a ground-engaging frame assembly. A swingable tongue is pivotally mounted to the implement along a pivot axis which is typically generally centrally located along the frame. An elongated mechanical drive assembly, which is supported by the swingable tongue and which is driven by the PTO of the towing vehicle, drivingly joins with the pivotable main gearbox which drives foliage cutting and/or foliage-working mechanisms of the implement. An extension assembly, which is typically forwardly directed, is secured to the gearbox and is in operative engagement with a rearwardly directed portion of the drive assembly. Lateral, generally horizontal movement of the rearward portion of the drive assembly effects generally corresponding lateral movement of the main gearbox in order to pivot same on the implement and maintain a generally straight drive assembly rear portion.

It is accordingly a general object of the present invention to provide an improved foliage mowing implement having a mechanical drive mechanism which interacts with a rotatable main gearbox.

Another object of the present invention is to provide an improved center pivot foliage mowing implement having a swingable tongue and a main gearbox which is rotatable so as to provide rotational mechanical driving power at swinging angles which generally correspond to the swinging angles through which the swingable tongue moves during use of the implement.

Another object of this invention is to provide an improved center pivot disc mower conditioner having a drive shaft assembly which "steers" the main gearbox to effect rotation of the gearbox to accommodate swinging movement of the hitching tongue.

Another object of the present invention is to provide an improved mechanical drive assembly for a mowing implement which requires a mechanical drive arrangement that pivots at the location of driving engagement with the implement without requiring split equal angles development along the drive train.

Another object of this invention is to provide an improved pivoting mechanical drive assembly which accommodates normal vertical header movement while being responsive to side-to-side swinging movement of the tongue.

These and other objects, features and advantages of the present invention will be apparent from and clearly understood through a consideration of the following detailed description.

BRIEF DESCRIPTION OF THE DRAWINGS

In the course of this description, reference will be made to the attached drawings, wherein:

FIG. 5 is a side elevational view of the embodiment illustrated in FIG. 4, showing up-and-down movement of the rotatable drive member to accommodate vertical movement of an implement header, for example;

FIG. 6 is a top plan view of the FIG. 4 embodiment;

DESCRIPTION OF THE PREFERRED EMBODIMENTS

Figure 1:
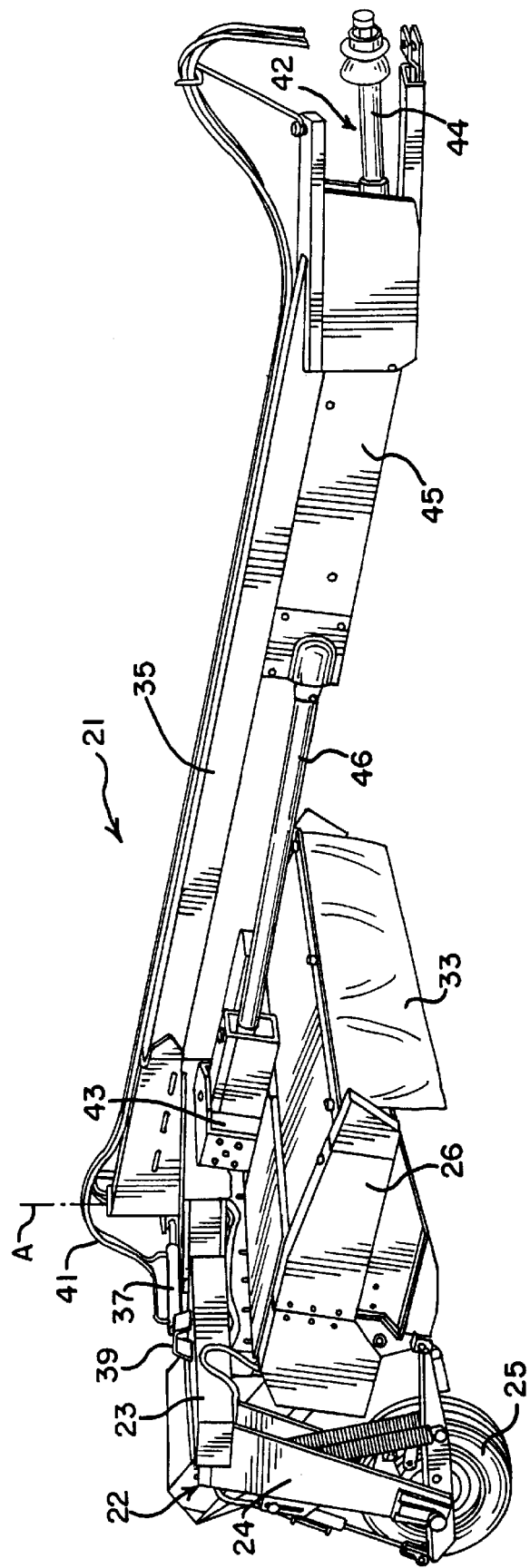
FIG. 1 is a perspective view of an implement incorporating the features of the present invention.

A foliage mowing implement embodying the drive mechanism of the present invention is generally shown in FIG. 1. The particular implement which is illustrated is a disc mower conditioner, generally designated at 21. Details of particular disc mowing assemblies are not illustrated, and suitable such assemblies are generally known in the art. These assemblies can engage ground foliage and sever same, such as for harvesting into bales or silage. With a mower conditioner such as the illustrated implement, the severed foliage is crimped, bent, flattened or "conditioned" by suitable conditioning means such as those including conditioning rollers. Suitable conditioning means are generally known in the art.

The illustrated implement 21 includes a frame, generally designated at 22. The illustrated frame includes an upper, generally horizontal crossbeam or frame member 23. A pair (only one being shown) of downwardly depending frame members 24 are provided for mounting ground-engaging wheels 25.

Figure 2:
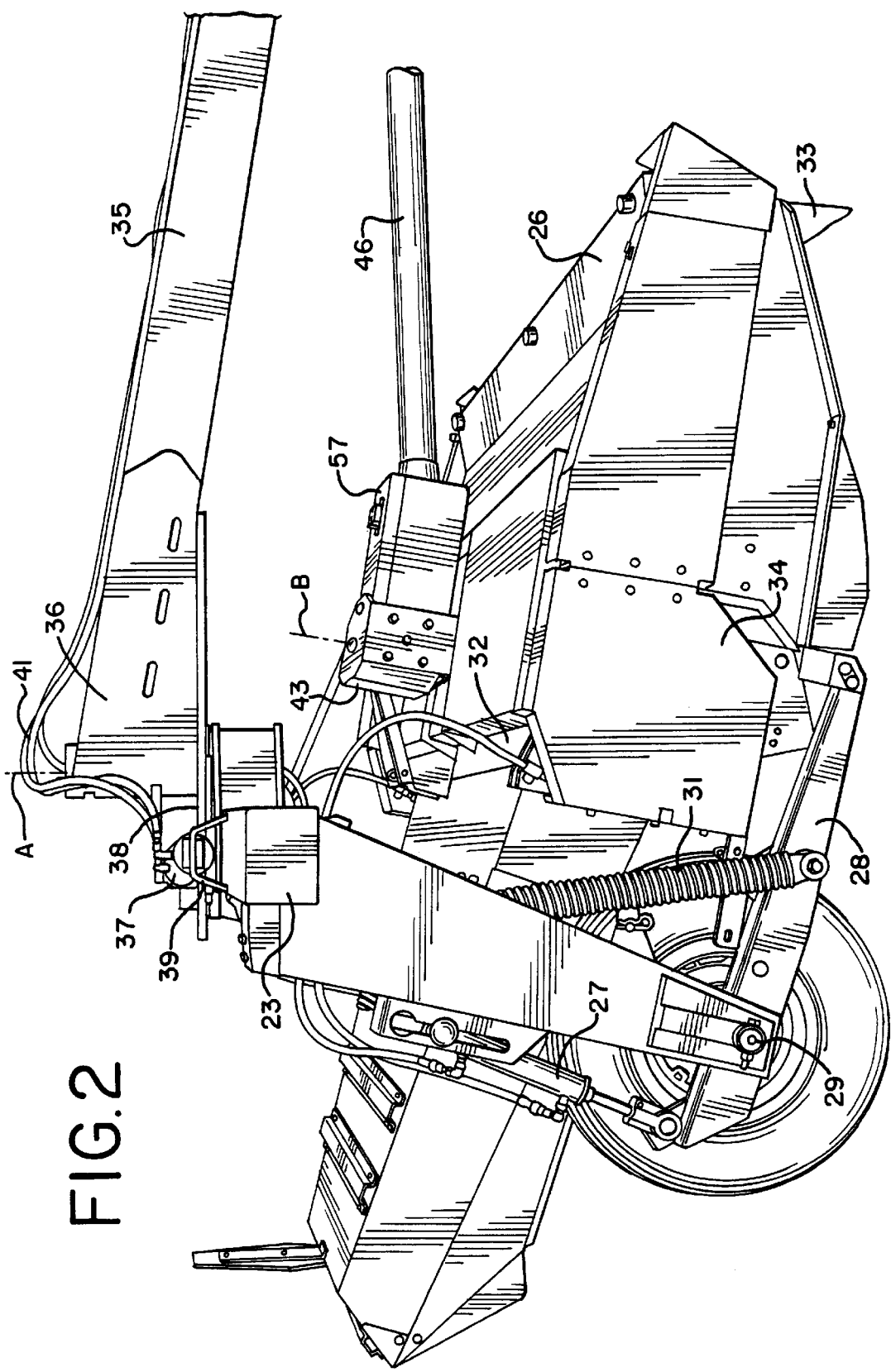
FIG. 2 is an enlarged perspective view of the implement shown in FIG. 1 and with the device in a lowered, working orientation.

Illustrated implement 21 includes a header 26 within which the foliage-cutting mechanisms are mounted. Header 26 is rotatably suspended so as to enable it to move between a raised, transport position as shown in FIG. 1 and a lowered, working position as shown in FIG. 2. In this particular illustration, such movement is accomplished by a hydraulic lift cylinder 27 which moves a pivot arm 28 about its pivot axis 29. This header movement, particularly upward movement, can be facilitated by a lift assist flotation mechanism 31 in a manner generally known in the art. Illustrated header 26 includes a crossbeam 32. Also shown is a safety curtain 33 in order to minimize the risk that debris will be thrown forwardly out of the confines of the header.

Inasmuch as the illustrated implement is a mower conditioner, a crop conditioner unit 34 is positioned rearwardly of the header. In accordance with generally known principles, the cut foliage or crop flows into the conditioner unit, at which location same is conditioned and discharged from the crop conditioner unit.

Implement 21 includes a swingable tongue 35. The forward end of the tongue 35 has a hitching arrangement which is generally known in the art for securement to a towing vehicle such as a tractor. The particular illustrated hitch assembly includes hitch straps at its forwardmost end. In this way, the swingable tongue has a forward portion which is adapted for hitching engagement with the towing vehicle. The rear portion of the swingable tongue 35 is raised with respect to the header 26 in order to provide adequate clearance for movement and pivoting of the header and mechanical drive train, even when same are in their respective transport positions as shown in FIG. 1.

In the particularly illustrated embodiment, rearward end portion 36 of the swingable tongue is pivotally mounted to the frame 22 along a generally vertical axis "A". The invention is especially suitable for situations in which the implement is of a so-called center pivot type. In such devices, the beam or hitch pivot axis is generally centrally located from right to left along the horizontal frame member 23. Selecting such a centered pivot axis facilitates swinging of the implement between the left side and the right side of the driving path of the towing vehicle, especially when compared with a situation wherein the tongue pivot axis is at an end portion of the frame.

A suitable mechanism will be provided for effecting the swinging movement when desired. A swing mechanism is provided for effecting this type of swinging movement. Illustrated hydraulic swing cylinder 37 is positioned between a rearwardly extending lever arm 38 of the swingable tongue 35 and an anchoring member 39 secured onto the crossbeam 23. Hydraulic swing cylinder 37 is operated from the towing vehicle by passing hydraulic fluid through a pair of hydraulic lines 41 in a well-known manner. It will be appreciated that, with the illustrated arrangement, inward movement of the rod of the hydraulic swing cylinder 37 rotates the swingable tongue in a counter-clockwise direction (when viewed from above). When this rotation has progressed to an adequate extent, the implement 21 will be positioned to the right of a forward-facing operator of the towing vehicle, more particularly to the right of the traveling path of the towing vehicle. Extension of the hydraulic swing cylinder 37 effects clockwise rotation and swinging of the implement to the left side of the towing vehicle path.

A drive assembly, generally designated 42, drivingly joins the PTO of the towing vehicle (not shown) to a main gearbox 43 of the implement. The forward end of the drive assembly 42 includes an end assembly for engagement with a power-take-off device of the towing vehicle in a manner which is well known in the art. A forward portion of the drive shaft 44 is driven by the PTO at available rotation speeds, typically either 540 rpm or 1000 rpm. The drive assembly 42 continues uninterrupted, except for a slip clutch and an overrunning clutch, through to the main gearbox 43.

Figure 8:
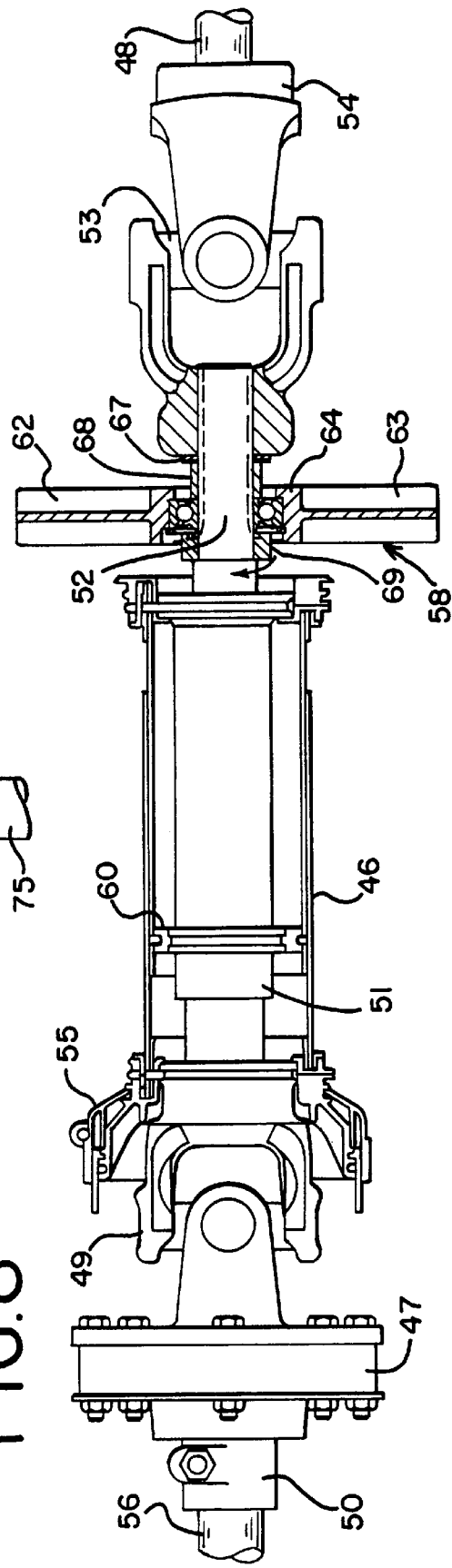
FIG. 8 is a side elevational view, partially in cross-section, of a substantial portion of the rear end of the driving mechanism, including a preferred embodiment of a pivot bearing assembly.
Figure 9:
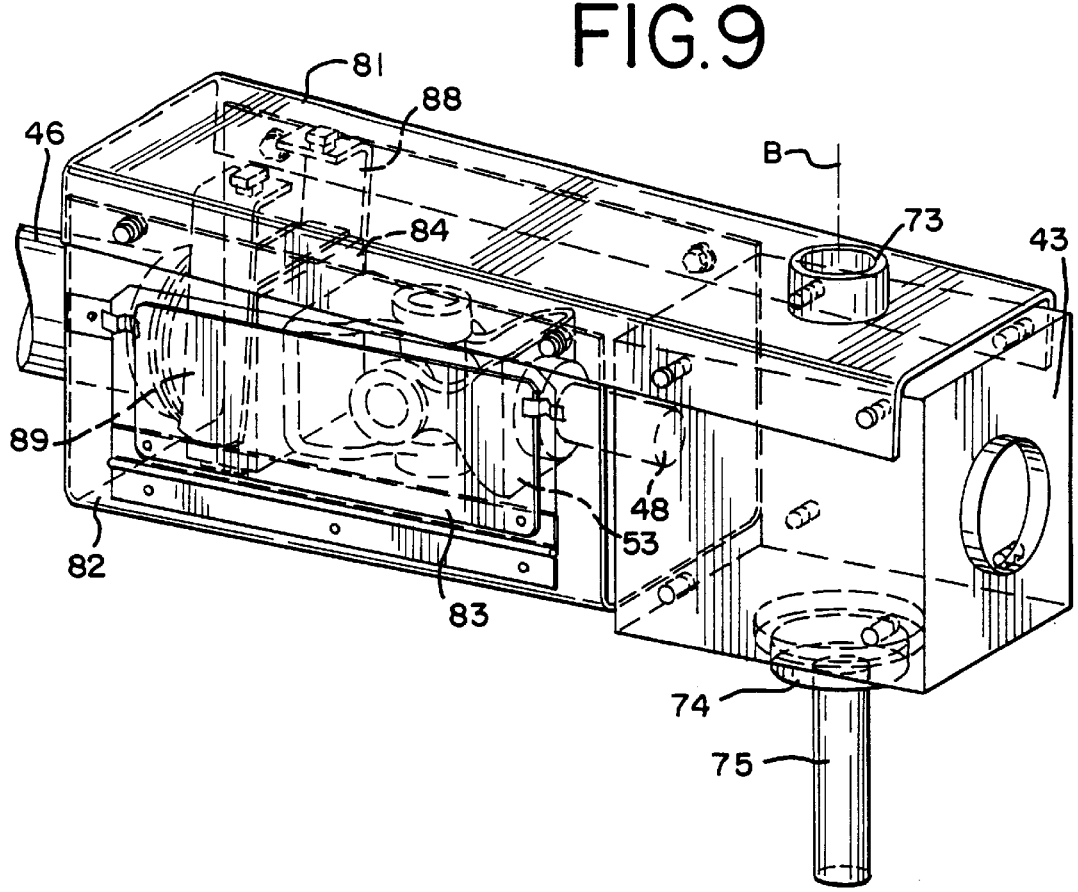
FIG. 9 is a rear perspective view of an alternative embodiment of a pivoting gearbox with a forwardly directed extension assembly.

A portion of the drive assembly in the illustrated embodiment is hidden from view by depending shield panels 45. Suitable supports will be useful in securely supporting the drive assembly from the swingable tongue in the area of the shield panels 45. In the illustrated embodiment, cylindrical safety casings are mounted and are positioned over the rotating shafts of the drive assembly. In this respect, the depending shield panels 45 and the structure associated with same also provide a supporting effect. Exemplary cylindrical shielding 46 and end shield 55 are found in FIG. 8, as is a stabilizer 60 of generally known construction to avoid bounce action between the shaft and the shielding.

Main gearbox 43 is pivotally connected to the implement along pivot axis "B". As will be evident hereinafter, this pivot axis "B" substantially coincides with the axis of the output member from the main gearbox 43. In an important aspect of the invention, pivoting along this axis "B" is accomplished in the absence of any type of steering mechanism between the tongue 35 and the main gearbox 43.

An elongated universal joint assembly is the rearward-most component of the illustrated elongated drive shaft. This elongated U-joint assembly is more fully shown in FIG. 8. It runs generally between a slip clutch 47 and input shaft 48 into the main gearbox 43. More particularly, the illustrated U-joint assembly includes a universal joint 49, a telescoping drive shaft 51, a receptor shaft 52, a universal joint 53, and an input shaft mounting hub 54. In the particular embodiment which is shown in the drawings, clutch 47 and universal joint 49 are positioned within the shield panels 45 in conjunction with an end shield 55 which supports and shields these components as well as the elongated cylindrical shielding 46. In the illustrated embodiment an overrunning clutch 50 is paired with the slip clutch 47. An internal or intermediate drive shaft 56 rotatably and drivingly connects this clutch assembly to the forward drive shaft 44.

In an important aspect of the invention, an extension assembly is secured to the main gearbox 43. The illustrated embodiments have extension assemblies which have a generally box-like structure and are generally rectangular in transverse cross-section. Other structures are suitable for the extension assembly, such as enclosed or partially enclosed channels which are circular, oval or elliptical in transverse cross-section. Other overall shapes can also be suitable. The extension assembly could take the form of an upper extension plate and a lower extension plate. A unitary or one piece member can also serve as the extension assembly.

Figure 3:
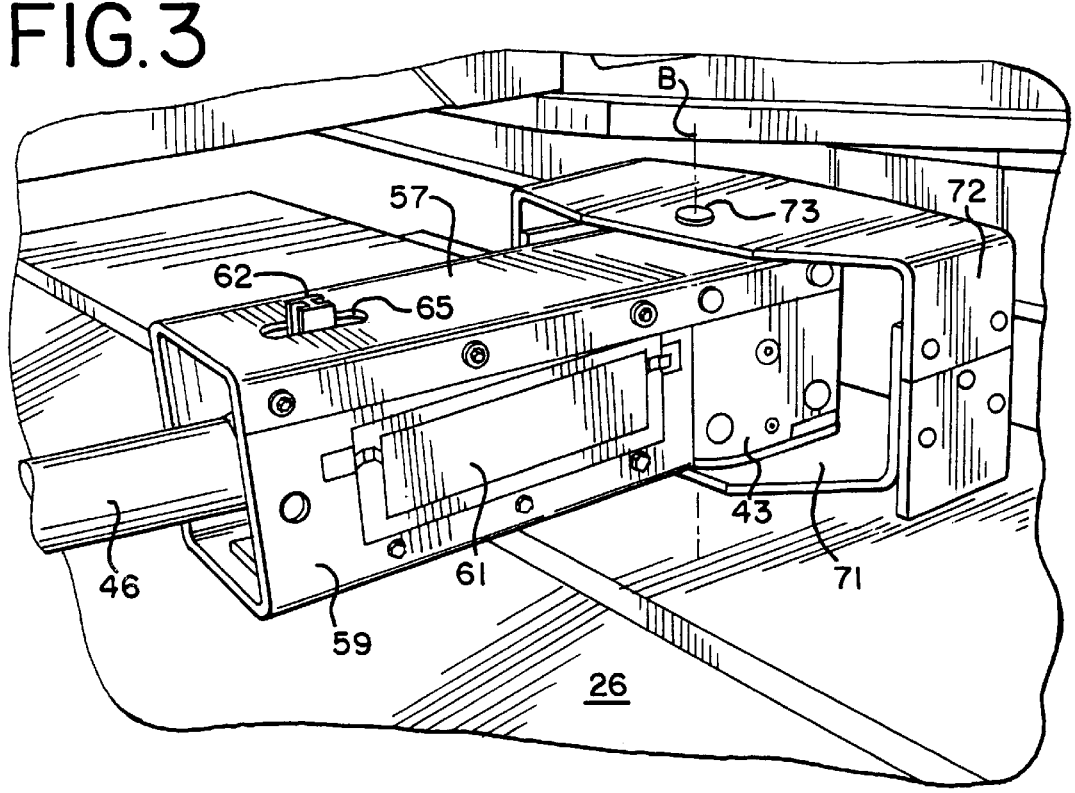
FIG. 3 is a detailed perspective view of the pivoting gearbox area of the implement illustrated in FIG. 1 and FIG. 2.

FIG. 3 and various other views show an extension assembly which includes an extension member 57 rigidly secured to the main gearbox 43. The illustrated extension member 57 provides a forwardly directed projection of the pivotable main gearbox 43. A connector or connection assembly, generally designated at 58, responsively joins extension member 57 to the elongated universal joint assembly, preferably at its receptor shaft 52. With this arrangement, movement of the universal joint assembly generally horizontally to the left of a forward facing driver of the towing vehicle moves the connector 58 to the left which in turn moves the extension member 57 to the left, thereby pivoting the main gearbox 43 around axis "B" in a counterclockwise direction as viewed from above, such as in FIG. 6. Similarly, movement of the universal joint to the right pivots the main gearbox in a clockwise direction.

With more particular reference to the main gearbox pivot movement mechanism which is illustrated in FIG. 3 through FIG. 8, the extension assembly incorporating the extension member 57 is associated with a lower extension 59 in order to work in unison with the extension member to rotate the gearbox and to provide a safety enclosure. An access panel or door assembly 61 allows for easy servicing of components within the extension assembly in order to permit, for example, lubrication of the universal joint 53.

The enclosure thus formed by these components incorporates a structure to allow for up-and-down movement of the elongated universal joint assembly with respect to and within the extension assembly, while preventing any substantial side-to-side movement between these components. These functions are performed according to this particular embodiment by structuring the connector 58 to include opposing projections 62 and 63 of a bearing 64. Projections 62 and 63 are freely slidably located within respective openings or slots 65 and 66 of this illustrated embodiment. Each illustrated slot 65 and 66 has an edge 96. Direct contact between these edges and the respective projections 62 and 63 preferably is prevented by plate bearings 93 and 94. Each such bearing has an opening or slot having an edge 95. During relative movement between the extension assembly and the bearing 64, the projections 62 and 63 of the bearing 64 engage the low friction edge 95 of each plate bearing 93 and 94, which allows free vertical movement of bearing 64 within the extension assembly and reduces wear and noise.

In an especially advantageous arrangement, the responsive connection between the elongated universal joint assembly and the connector 58 is between its bearing 64 and the receptor shaft 52, which is a cylindrical rotatable component of the universal joint assembly. This minimizes any possible interference with rotation of the universal joint assembly while providing a secure and protected location for such connection and which is closely spaced from the pivot axis "B". This is accomplished while providing a lever arm of adequate length between the receptor shaft 52 and the pivot axis "B". Washers 67 and a spacer 68, which can be in the form of a collar, provide secure positioning in the rearward direction for the connection assembly 58. A locking collar 69 is further provided. Preferably, this collar 69 is locked in the direction shown by the arrowhead in FIG. 8, which is the direction of shaft rotation commonly understood in the industry.

FIG. 5 depicts in phantom lines vertical generally upward movement of the drive shaft 51 and of its cylindrical shielding 46 with respect to the main gearbox 43 without interference from the extension member 57 and lower extension 59. This type of movement accommodates, for example, pivoting of the header 26 between the transport position shown in FIG. 1 and the operating or foliage cutting position of FIG. 2. It also accommodates various header tilt angles corresponding to different heights of material cut. At the same time, left-to-right or generally horizontal movement between these same components is substantially prevented. There is substantially zero generally horizontal movement of the drive shaft within the extension assembly. Thus there is substantially direct correspondence between such drive shaft movement and pivoting of the main gearbox.

Figure 4:
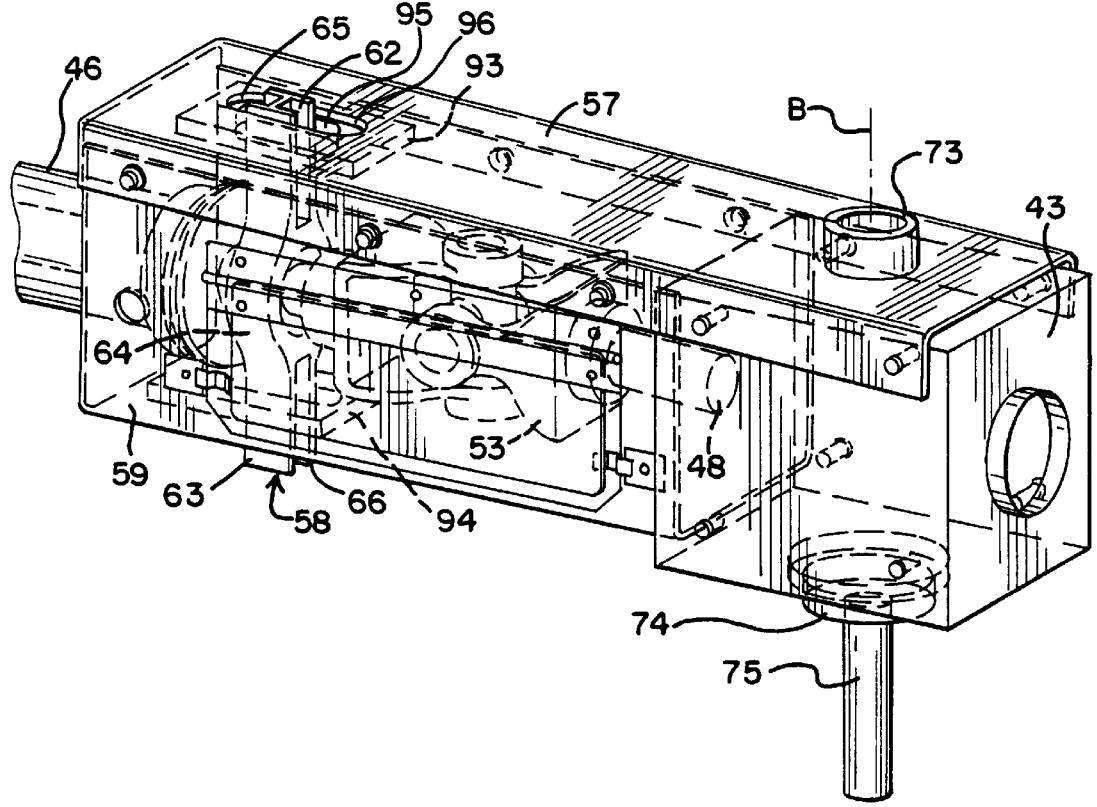
FIG. 4 is a left rear perspective view illustrating various components of a preferred embodiment of the pivoting gearbox with a forwardly directed extension assembly.
Figure 7:
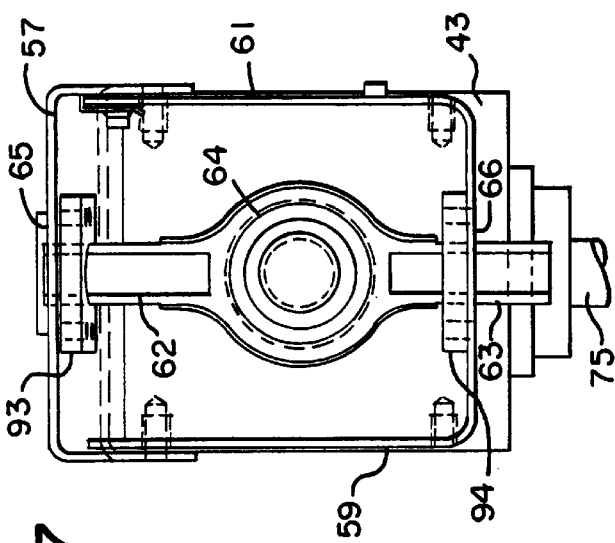
FIG. 7 is a front elevational view of the FIG. 4 embodiment.

As is evident from FIGS. 3 and 4, secure pivotal mounting of the main gearbox 43 can be achieved by suitable mounting frame members 71, 72 and bushing surface 73, which can be conveniently positioned within a bushing in a mounting frame member 72. A somewhat similar bushing in mounting frame member 71 accommodates bushing surface 74, through which driven shaft 75 passes out of the main gearbox 43. Although a multiple-component mounting frame is shown, a single-component mounting frame could be used instead.

Details of the gearing within the main gearbox 43 are conventional, typically including one or more bevel gear sets (not shown) so as to drivingly join input shaft 48 to output shaft 75. It will be appreciated that output shaft 75 (and/or another suitable output shaft or member) provides driving power to the foliage severing members or blades (not shown) and to the conditioning members or rollers (not shown), when provided.

Referring now to the alternate embodiment illustrated in FIGS. 9, 10, 11 and 12, the extension assembly having an extension member 81 securely fastened to the main gearbox 43 substantially corresponds to extension member 57 of the preferred embodiment shown in FIGS. 3, 4, 5, 6 and 7. Also somewhat similar to the preferred embodiment, a lower extension 82 works in unison with the extension member 81 and provides a safety enclosure, and a door assembly 83 provides for easy servicing access.

Figure 10:
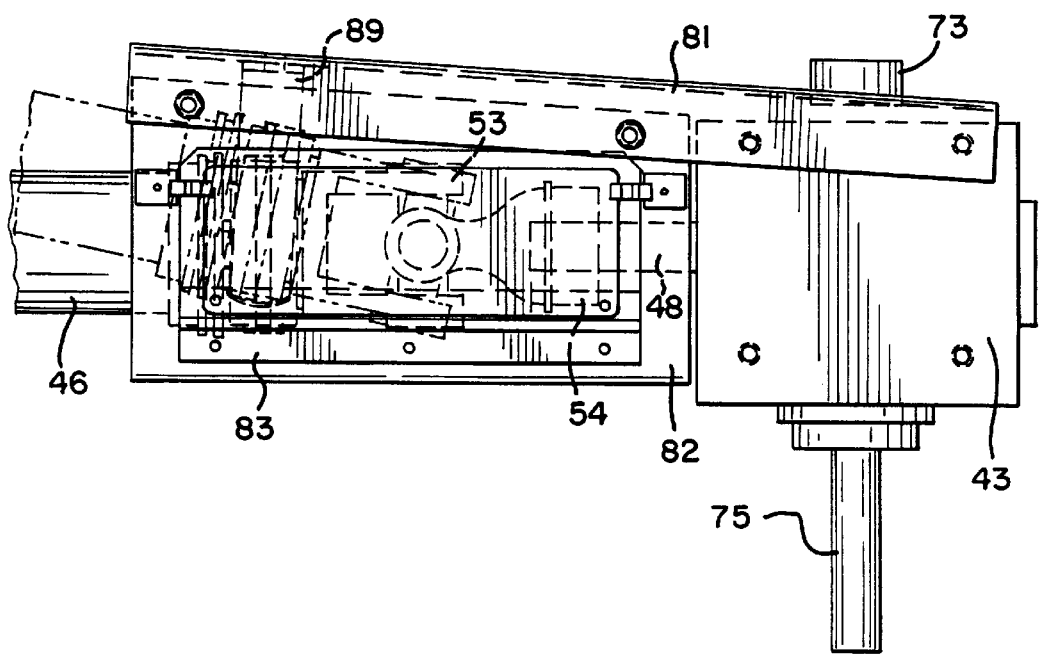
FIG. 10 is a side elevational view of the FIG. 9 embodiment, illustrating up-and-down movement of the rotatable driving member.
Figure 11:
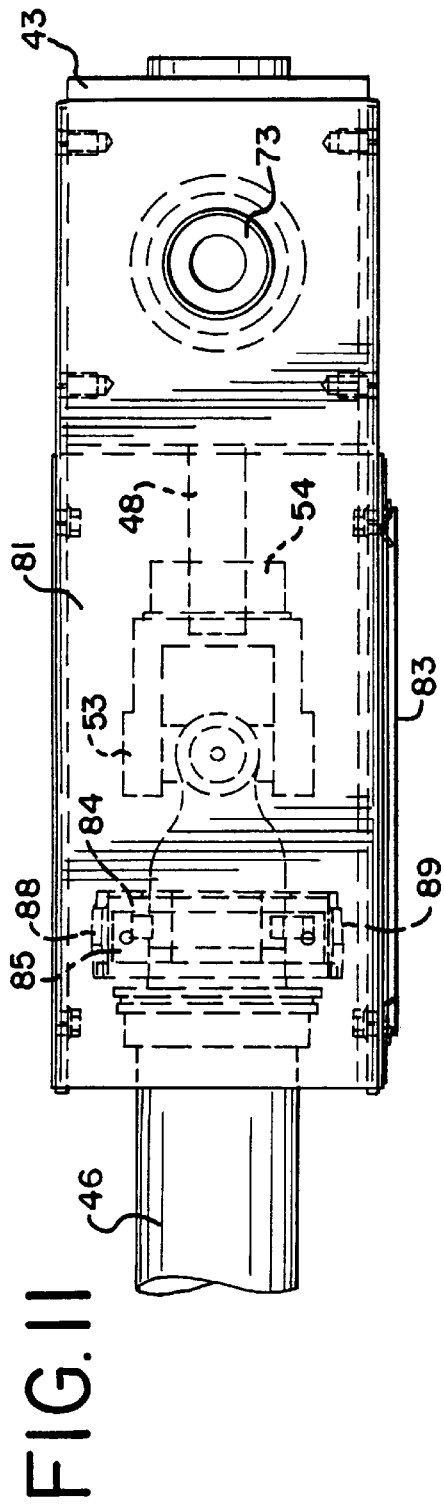
FIG. 11 is a top plan view of the arrangement of FIG. 9.
Figure 12:
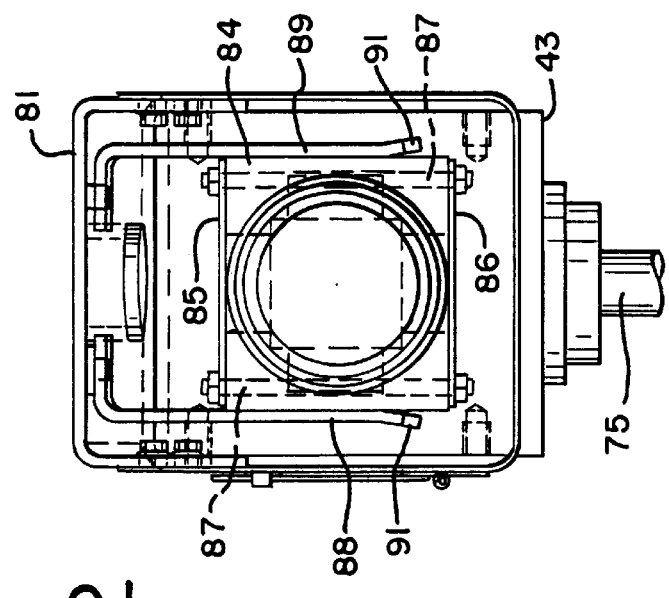
FIG. 12 is a front elevational view of the alternate embodiment which is shown in FIG. 9.

Along the lines of function provided by the preferred embodiment, this alternative embodiment, as perhaps best illustrated in FIG. 10, allows for limited up-and-down or vertical movement of the drive shaft with respect to the main gearbox, while substantially preventing any lateral or horizontal movement therebetween. This is accomplished while securely holding the operative engagement therebetween while permitting the necessary substantial rotation of the drive shaft mechanism. A bearing assembly 84, which can be split bearing assemblies joined together, provides a substantially cylindrical low friction surface within which a cylindrical portion of the universal joint assembly can freely rotate. Opposing bearing covers 85, 86 can be secured together by suitable means such as the illustrated bolts 87 (FIG. 12).

Thus formed bearing assembly is mounted within the extension assembly for generally vertical slidable movement. This movement is accommodated by framing in the illustrated embodiment, wherein such is provided by angle straps 88, 89 which are securely attached to the extension assembly. It is possible that angle straps 88, 89 can be omitted, provided the bearing assembly is properly sized and configured so as to closely slide within the extension assembly. Preferably, the angle straps, when provided, are flared outwardly as at 91, in order to minimize the possibility that the angle straps will dig into the bearing assembly during up and down movement of the drive shaft and of the bearing assembly.

The bearing component of the illustrated embodiments can be lubricious material blocks, such as known bearings of polymeric materials, such as Delryn®. Sintered bronze bearing members can also be suitable. Also possible are ball-and-race bearing assemblies or any other approach for allowing for low-friction rotation between cylindrical engagement members.

In a most simplified arrangement, a forwardly extending member or assembly has a downwardly directed arm with a member for engaging the universal joint assembly so as to move the arm generally horizontally with the drive shaft. The downwardly directed arm then imparts like movement to the extension member in order to appropriately pivot the main gearbox.

It will be understood that the embodiments of the present invention which have been described are illustrative of some of the applications of the principles of the present invention. Various modifications may be made by those skilled in the art without departing from the true spirit and scope of the invention.

What is claimed is:

1. A foliage mowing implement, comprising:
   a frame including a generally horizontal frame portion;
   ground-engaging wheels in pivotal operative engagement with said frame;
   a header for cutting foliage, said header being supported by said frame;
   a swingable tongue having a rearward portion and a forward portion, said rearward portion being pivotally mounted to said frame around a pivot axis, said forward portion of the tongue being adapted for hitching engagement with a towing vehicle;
   an elongated mechanical drive assembly having a rearward portion and forward portion, said forward portion of the elongated mechanical drive assembly being adapted to be rotatably driven by the towing vehicle;
   a main gearbox pivotally mounted to the implement, said main gearbox being in driven engagement with said rearward portion of the elongated mechanical drive assembly, and said main gearbox having an output member for operating said header to cut foliage;
   a forwardly directed extension from the gearbox; and
   a connection member which is in grasping engagement with at least a section of said rearward portion of the elongated mechanical drive assembly, and said connection member also is in operative engagement with said forwardly directed extension,
   whereby lateral generally horizontal movement of said rearward portion of the drive assembly in one direction also laterally moves said connection member, and said connection member then laterally moves said forwardly directed extension in said one direction to thereby pivot said gearbox on said implement.

2. The implement in accordance with claim 1, wherein said connection member is slidably movable with respect to said forwardly directed extension to permit limited upward and downward movement of the rearward portion of the elongated mechanical drive assembly with respect to said main gearbox, and said connection member also engages said forwardly directed extension to substantially prevent any lateral, generally horizontal movement between said rearward portion of the elongated mechanical drive assembly and said main gearbox.

3. The implement in accordance with claim 1, wherein said connection member includes a bearing which engages a rotating portion of the mechanical drive assembly.

4. The implement in accordance with claim 3, wherein said bearing is at a location closely spaced from said main gearbox.

5. A foliage mowing implement, comprising:

a frame including a generally horizontal frame portion;

ground-engaging wheels in pivotal operative engagement with said frame;

a header for cutting foliage, said header being supported by said frame;

a swingable tongue having a rearward portion and a forward portion, said rearward portion being pivotally mounted to said frame around a pivot axis, said forward portion of the tongue being adapted for hitching engagement with a towing vehicle;

an elongated mechanical drive assembly having a rearward portion and forward portion, said forward portion of the elongated mechanical drive assembly being adapted to be rotatably driven by the towing vehicle;

a main gearbox pivotally mounted to the implement, said main gearbox being in driven engagement with said rearward portion of the elongated mechanical drive assembly, and said main gearbox having an output member for operating said header to cut foliage;

a forwardly directed extension from the gearbox; and a connection assembly in grasping engagement with at least a section of said rearward portion of the elongated mechanical drive assembly and in operative engagement with said forwardly directed extension, said connection assembly includes a bearing which engages a rotating portion of the mechanical drive assembly, and said bearing exhibits limited vertical movement and virtually no horizontal movement with respect to the main gearbox;

wherein lateral generally horizontal movement of said rearward portion of the drive assembly in one direction also laterally moves said forwardly directed extension in said one direction to thereby pivot said gearbox on said implement.

6. The implement in accordance with claim 1, wherein said rearward portion of the elongated mechanical drive assembly includes a universal joint secured to an input member of said main gearbox and a receptor shaft substantially immediately forward of said universal joint, and wherein said connection member includes a bearing positioned over said receptor shaft.

7. A foliage mowing implement, comprising:

a frame including a generally horizontal frame portion;

ground-engaging wheels in pivotal operative engagement with said frame;

a header for cutting foliage, said header being supported by said frame;

a swingable tongue having a rearward portion and a forward portion, said rearward portion being pivotally mounted to said frame around a pivot axis, said forward portion of the tongue being adapted for hitching engagement with a towing vehicle;

an elongated mechanical drive assembly having a rearward portion and forward portion, said forward portion of the elongated mechanical drive assembly being adapted to be rotatably driven by the towing vehicle;

a main gearbox pivotally mounted to the implement, said main gearbox being in driven engagement with said rearward portion of the elongated mechanical drive assembly, and said main gearbox having an output member for operating said header to cut foliage;

a forwardly directed extension from the gearbox; and a connection assembly in grasping engagement with at least a section of said rearward portion of the elongated mechanical drive assembly and in operative engagement with said forwardly directed extension, said connection assembly includes a bearing member which engages said forwardly directed extension of the main gearbox to prevent lateral movement of the bearing assembly, and said bearing member is mounted for slidable generally vertical movement with respect to said forwardly directed extension from the main gearbox;

wherein lateral generally horizontal movement of said rearward portion of the drive assembly in one direction also laterally moves said forwardly directed extension in said one direction to thereby pivot said gearbox on said implement.

8. A foliage mowing implement, comprising:

a frame including a generally horizontal frame portion;

ground-engaging wheels in pivotal operative engagement with said frame;

a header for cutting foliage, said header being supported by said frame;

a swingable tongue having a rearward portion and a forward portion, said rearward portion being pivotally mounted to said frame around a pivot axis, said forward portion of the tongue being adapted for hitching engagement with a towing vehicle;

an elongated mechanical drive assembly having a rearward portion and forward portion, said forward portion of the elongated mechanical drive assembly being adapted to be rotatably driven by the towing vehicle, said rearward portion of the elongated mechanical drive assembly includes a universal joint secured to an input member of said main gearbox and a receptor shaft substantially immediately forward of said universal joint;

a main gearbox pivotally mounted to the implement, said main gearbox being in driven engagement with said rearward portion of the elongated mechanical drive assembly, and said main gearbox having an output member for operating said header to cut foliage;

a forwardly directed extension from the gearbox; and a connection assembly in grasping engagement with at least a section of said rearward portion of the elongated mechanical drive assembly, and said connection member also is in operative engagement with said forwardly directed extensions said connection assembly includes a bearing member which engages said forwardly directed extension of the main gearbox to prevent lateral movement of the bearing member, and said bearing member is mounted for slidable generally vertical movement with respect to said forwardly directed extension from the main gearbox, and wherein said bearing member is mounted over said receptor shaft;

wherein lateral generally horizontal movement of said rearward portion of the drive assembly in one direction also laterally moves said forwardly directed extension in said one direction to thereby pivot said gearbox on said implement.

9. The implement in accordance with claim 8, wherein said forwardly directed extension includes an opening therein, and wherein said bearing member has an upwardly extending projection which passes into said opening and moves with respect to said opening during upward and downward movement of said rearward portion of the drive assembly.

10. The implement in accordance with claim 8, wherein a lower extension is secured to said forwardly directed extension to form an extension assembly, at least two openings are provided in said extension assembly, wherein said bearing member includes at least two projections therefrom, and each said projection passes through a respective said opening and moves with respect thereto during generally vertical movement of said rearward portion of the drive assembly.

11. A foliage mowing implement, comprising:

a frame including a generally horizontal frame portion;

ground-engaging wheels in pivotal operative engagement with said frame;

a header for cutting foliage, said header being supported by said frame;

a swingable tongue having a rearward portion and a forward portion, said rearward portion being pivotally mounted to said frame around a pivot axis, said forward portion of the tongue being adapted for hitching engagement with a towing vehicle;

an elongated mechanical drive assembly having a rearward portion and forward portion, said forward portion of the elongated mechanical drive assembly being adapted to be rotatably driven by the towing vehicle;

a main gearbox pivotally mounted to the implement, said main gearbox being in driven engagement with said rearward portion of the elongated mechanical drive assembly, and said main gearbox having an output member for operating said header to cut foliage;

a forwardly directed extension from the gearbox; and a connection assembly in grasping engagement with at least a section of said rearward portion of the elongated mechanical drive assembly and in operative engagement with said forwardly directed extension;

said forwardly directed extension has an opening therethrough, a lower extension is secured to said forwardly directed extension and includes an opening therethrough which is in generally opposing alignment with said opening of the forwardly directed extension, wherein said connection assembly includes a bearing member positioned over a surface of the rearward portion of the drive assembly which is closely spaced from the main gearbox, said connection assembly further including generally opposing projections from said bearing member, one of said opposing projections passing generally vertically through said opening of the forwardly directed extension, and the other of said opposing projections passing generally vertically through said opening of the lower extension in response to generally vertical movement of said rearward portion of the elongated mechanical drive assembly;

wherein lateral generally horizontal movement of said rearward portion of the drive assembly in one direction also laterally moves said forwardly directed extension in said one direction to thereby pivot said gearbox on said implement.

12. The implement in accordance with claim 11, wherein each said opposing projection engages its said respective opening during lateral, generally horizontal movement of said rearward portion of the elongated mechanical drive assembly, thereby preventing any substantial lateral movement of said rearward portion of the elongated mechanical drive assembly with respect to said main gearbox, thereby resulting in rotation of said main gearbox about a generally vertical axis thereof.

13. A foliage mowing implement, comprising:

a frame including a generally horizontal frame portion;

ground-engaging wheels in pivotal operative engagement with said frame;

a header for cutting foliage, said header being supported by said frame;

a swingable tongue having a rearward portion and a forward portion, said rearward portion being pivotally mounted to said frame around a pivot axis, said forward portion of the tongue being adapted for hitching engagement with a towing vehicle;

an elongated mechanical drive assembly having a rearward portion and forward portion, said forward portion of the elongated mechanical drive assembly being adapted to be rotatably driven by the towing vehicle;

a main gearbox pivotally mounted to the implement, said main gearbox being in driven engagement with said rearward portion of the elongated mechanical drive assembly, and said main gearbox having an output member for operating said header to cut foliage;

a forwardly directed extension from the gearbox; and a connection assembly in grasping engagement with at least a section of said rearward portion of the elongated mechanical drive assembly and in operative engagement with said forwardly directed extension;

said connection assembly includes a bearing member positioned over a rotatable cylindrical portion of the rearward portion of the elongated mechanical drive assembly, said rotatable cylindrical portion being closely spaced from said main gearbox, and said bearing member being mounted with respect to said forwardly directed extension so as to permit generally vertical slidable movement of said bearing member with respect to said main gearbox while preventing any substantial horizontal movement of said bearing member with respect to said gearbox;

wherein lateral generally horizontal movement of said rearward portion of the drive assembly in one direction also laterally moves said forwardly directed extension in said one direction to thereby pivot said gearbox on said implement.

14. A foliage mowing implement, comprising:

a frame including a generally horizontal frame portion;

around-engaging wheels in pivotal operative engagement with said frame;

a header for cutting foliage, said header being supported by said frame;

a swingable tongue having a rearward portion and a forward portion, said rearward portion being pivotally mounted to said frame around a pivot axis, said forward portion of the tongue being adapted for hitching engagement with a towing vehicle;

an elongated mechanical drive assembly having a rearward portion and forward portion, said forward portion of the elongated mechanical drive assembly being adapted to be rotatably driven by the towing vehicle;

a main gearbox pivotally mounted to the implement, said main gearbox being in driven engagement with said rearward portion of the elongated mechanical drive assembly, and said main gearbox having an output member for operating said header to cut foliage;

a forwardly directed extension from the gearbox; and a connection assembly in grasping engagement with at least a section of said rearward portion of the elongated mechanical drive assembly and in operative engagement with said forwardly directed extension;

said connection assembly includes a bearing member in overlying engagement with a rearward section of said rearward portion of the elongated mechanical drive assembly, said connection assembly further including generally opposing angle strap members which are stationarily mounted with respect to said forwardly directed extension, and said bearing member is slidably mounted between said angle strap members to permit vertical movement of said bearing member while preventing any substantial horizontal movement of said bearing member with respect to said forwardly directed extension;

wherein lateral generally horizontal movement of said rearward portion of the drive assembly in one direction also laterally moves said forwardly directed extension in said one direction to thereby pivot said gearbox on said implement.

15. A foliage mowing implement, comprising:

a frame including a generally horizontal frame portion;

ground-engaging wheels in pivotal operative engagement with said frame;

a header for cutting foliage, said header being supported by said frame;

a swingable tongue having a rearward portion and a forward portion, said rearward portion being pivotally mounted to said frame around a pivot axis, said forward portion of the tongue being adapted for hitching engagement with a towing vehicle;

an elongated mechanical drive assembly having a rearward portion and forward portion, said forward portion of the elongated mechanical drive assembly being adapted to be rotatably driven by the towing vehicle, said rearward portion of the elongated mechanical drive assembly includes a universal joint secured to an input member of said main gearbox and a receptor shaft substantially immediately forward of said universal joint;

a main gearbox pivotally mounted to the implement, said main gearbox being in driven engagement with said rearward portion of the elongated mechanical drive assembly, and said main gearbox having an output member for operating said header to cut foliage;

a forwardly directed extension from the gearbox; and a connection assembly in grasping engagement with at least a section of said rearward portion of the elongated mechanical drive assembly and in operative engagement with said forwardly directed extension;

said connection assembly includes a bearing member in overlying engagement with said receptor shaft, said connection assembly further including generally opposing angle strap members which are stationarily mounted with respect to said forwardly directed extension, and said bearing member is slidably mounted between said angle strap members to permit vertical movement of said bearing member while preventing any substantial horizontal movement of said bearing member with respect to said forwardly directed extension;

wherein lateral generally horizontal movement of said rearward portion of the drive assembly in one direction also laterally moves said forwardly directed extension in said one direction to thereby pivot said gearbox on said implement.

16. A center pivot mower conditioner, comprising:

a frame including a generally horizontal frame portion and ground engaging wheels in pivotal operative association with said frame;

a header for cutting foliage, said header being supported by said frame;

a swingable tongue having a rearward portion and a forward portion, said rearward portion being pivotally mounted to said frame around a pivot axis, said tongue pivot axis being generally centrally located along said generally horizontal frame portion, said forward portion of the tongue being adapted for hitching engagement with the towing vehicle;

an elongated mechanical drive assembly having a rearward portion and a forward portion, said elongated mechanical drive assembly being supported by said swingable tongue at at least a single location, said forward portion of the elongated mechanical drive assembly being adapted to be rotatably driven by the towing vehicle;

a main gearbox pivotally mounted to the implement, said main gearbox having an input member in driven engagement with said rearward portion of the elongated mechanical drive assembly, and said main gearbox has an output member for operating said header;

a forwardly directed extension from said main gearbox;

a bearing assembly in generally overlying engagement with said rearward portion of the elongated mechanical drive assembly so as to move generally horizontally with said drive assembly rearward portion; and said bearing assembly is slidably mounted for generally vertical movement with respect to said forwardly directed extension and with respect to said main gearbox.

17. The center pivot mower conditioner in accordance with claim 16, wherein said bearing assembly is slidably mounted with respect to said forwardly directed extension in a manner which substantially prevents any generally horizontal movement of said bearing assembly with respect to said forwardly directed extension and said main gearbox.

18. The center pivot mower conditioner in accordance with claim 16, wherein said drive assembly rearward portion moves generally horizontally in substantial unison with generally horizontal movement of the swingable tongue.

19. The center pivot mower conditioner in accordance with claim 16, wherein said forwardly directed extension and bearing assembly permit limited upward and downward movement of the rearward portion of the elongated mechanical drive assembly with respect to said main gearbox while substantially preventing any lateral, generally horizontal movement between said rearward portion of the elongated mechanical drive assembly and said main gearbox.

20. The center pivot mower conditioner in accordance with claim 16, wherein said bearing assembly engages said forwardly directed extension to exhibit limited vertical movement and virtually no horizontal movement with respect to the main gearbox.

21. The center pivot mower conditioner in accordance with claim 16, wherein said rearward portion of the elongated mechanical drive assembly includes a universal joint secured to an input member of said main gearbox and a receptor shaft substantially immediately forward of said universal joint, and wherein said bearing assembly is positioned over said receptor shaft.

22. The center pivot mower conditioner in accordance with claim 21, wherein said bearing assembly engages said forwardly directed extension from the main gearbox to prevent lateral movement of the bearing member, and said bearing assembly is mounted for slidable generally vertical movement with respect to said forwardly directed extension from the main gearbox, and wherein said bearing assembly is mounted over said receptor shaft.

23. The center pivot mower conditioner in accordance with claim 22, wherein said forwardly directed extension includes an opening therein, and wherein said bearing assembly has an upwardly extending projection which passes into said opening and moves with respect to said opening during upward and downward movement of said rearward portion of the drive assembly.

24. The center pivot mower conditioner in accordance with claim 22, wherein said lower extension is secured to said forwardly directed extension to form an extension assembly, at least two openings are provided in said extension assembly, wherein said bearing assembly includes at least two projections therefrom, and each said projection passes through a respective said opening and moves with respect thereto during generally vertical movement of said rearward portion of the drive assembly.

25. The center pivot mower conditioner in accordance with claim 15, wherein said forwardly directed extension has an opening therethrough, a lower extension is secured to said forwardly directed extension and includes an opening therethrough which is in generally opposing alignment with said opening of the forwardly directed extension, wherein said bearing assembly includes a bearing member positioned over a surface of the rearward portion of the drive assembly which is closely spaced from the main gearbox, said bearing assembly further including generally opposing projections from said bearing member, one of said opposing projections passing generally vertically through said opening of the forwardly directed extension, and the other of said opposing projections passing generally vertically through said opening of the lower extension in response to generally vertical movement of said rearward portion of the elongated mechanical drive assembly.

26. The center pivot mower conditioner in accordance with claim 25, wherein each said opposing projection engages its said respective opening during lateral, generally horizontal movement of said rearward portion of the elongated mechanical drive assembly, thereby preventing any substantial lateral movement of said rearward portion of the elongated mechanical drive assembly with respect to said main gearbox, thereby resulting in rotation of said main gearbox about a generally vertical axis thereof.

27. The center pivot mower conditioner in accordance with claim 16, wherein said bearing assembly includes a bearing member positioned over a rotatable cylindrical portion of the rearward portion of the elongated mechanical drive assembly, said rotatable cylindrical portion being closely spaced from said main gearbox, and said bearing member being mounted with respect to said forwardly directed extension so as to permit generally vertical slidable movement of said bearing member with respect to said main gearbox while preventing any substantial horizontal movement of said bearing member with respect to said gearbox.

28. The center pivot mower conditioner in accordance with claim 16, wherein said bearing assembly includes a bearing member in overlying engagement with a rearward section of said rearward portion of the elongated mechanical drive assembly, said bearing assembly further including generally opposing angle strap members which are stationarily mounted with respect to said forwardly directed extension, and said bearing member is slidably mounted between said angle strap members to permit vertical movement of said bearing member while preventing any substantial horizontal movement of said bearing member with respect to said forwardly directed extension.

29. The center pivot mower conditioner in accordance with claim 21, wherein said bearing assembly includes a bearing member in overlying engagement with said receptor shaft, said bearing assembly further including generally opposing angle strap members which are stationarily mounted with respect to said forwardly directed extension, and said bearing member is slidably mounted between said angle strap members to permit vertical movement of said bearing member while preventing any substantial horizontal movement of said bearing member with respect to said forwardly directed extension.

* * * * *